(No Model.)
M. B. CHURCH.
MIXING AND PROPORTIONING GRANULAR OR PLASTIC MATERIALS FOR ALABASTINE, &c.
No. 304,615. Patented Sept. 2, 1884.
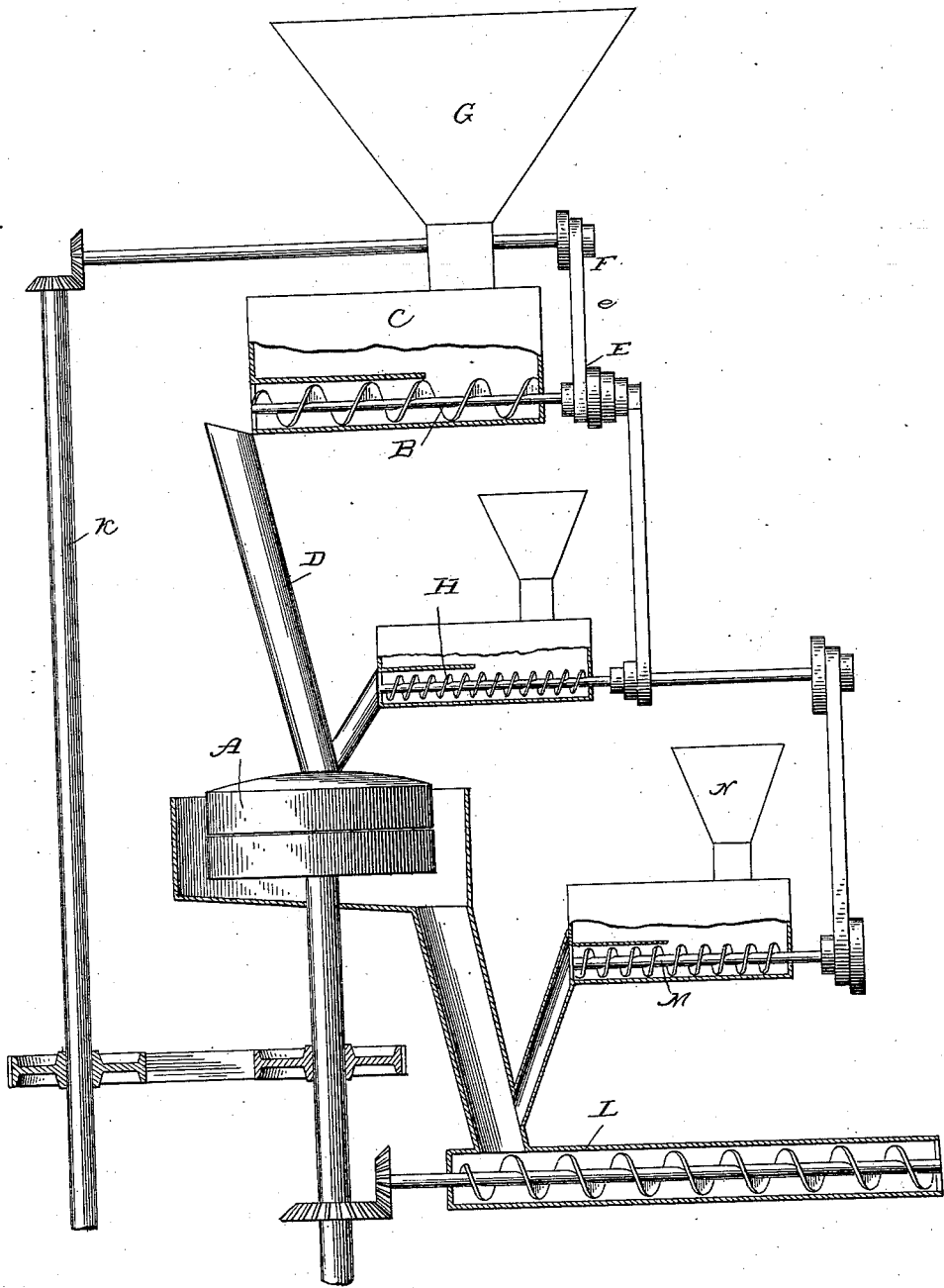

UNITED STATES PATENT OFFICE.

MELVIN B. CHURCH, OF GRAND RAPIDS, MICHIGAN.

MIXING AND PROPORTIONING GRANULAR OR PLASTIC MATERIALS FOR ALABASTINE, &c.

SPECIFICATION forming part of Letters Patent No. 304,615, dated September 2, 1884.

Application filed March 22, 1884. (No model.)

*To all whom it may concern:*

Be it known that I, MELVIN B. CHURCH, of Grand Rapids, in the county of Kent and State of Michigan, have invented a new and useful Improvement in Mixing and Proportioning Granular and Plastic Materials for Alabastine, &c.; and I do hereby declare that the following is a full, clear, and exact description of the same.

My invention relates to an improved mode of mixing granular or pulverized materials, and to an apparatus for that purpose. I have applied the mode and apparatus to the mixing of the materials used by me in the manufacture of the article known as "alabastine," which article is used as a plastic or semi-plastic coating for the walls of houses. It is, however, applicable to the mixing of other granular or pulverized material.

In the manufacture of alabastine as heretofore practiced the materials of which it has been composed have been separately ground and afterward measured in proper proportions, and then mixed by stirring the ingredients together. This requires care in measuring, in weighing, and stirring or shaking, and the expenditure of considerable labor or power under all circumstances, and it especially requires care in weighing, and the expenditure of power is continued in stirring or shaking when small quantities of one or more ingredients are to be mixed with a large proportion of another. Under such circumstances the difficulty lies in the perfect and uniform mixture of the lesser ingredient through the greater.

My invention consists, essentially, in conveying by positive feeding devices connected to each other or to a common driving-power the various ingredients into a common channel, stream, or receptacle, by which they are thoroughly mixed, and in exact and uniform proportions.

I have hereinafter described the invention, both as respects the mode of proceeding and the apparatus therefor, in connection with the manufacture of alabastine, and this will serve as a sufficient explanation for the use of the invention in the treatment of any other materials.

The accompanying drawing shows in side elevation and in section the apparatus used by me in connection with a grinding-mill for alabastine.

In the manufacture of alabastine I use for feeding the materials of which the mixture is to be composed the conveying apparatus shown in Letters Patent of the United States granted to me on the 13th day of June, 1882. When I am mixing colors or pigments, or any materials improved by regrinding together, or these colors and gypsum, I mix the gypsum and coloring material in the grinding apparatus, utilizing this apparatus as a mixer, and also to grind the colors and other materials together. To do this I convey the gypsum to the stones by means of the conveyer shown in my said patent, the screw of the said conveyer being geared to the driving mechanism of the mill, so as to run and vary therewith. I use another conveyer proportioned in size or speed to the first conveyer, according to the proportions acquired of the ingredients. This second conveyer is geared to the driving mechanism of the mill or to the first conveyer, and runs therewith, and is used to convey the pulverized or comminuted coloring material, which is discharged, together with the gypsum, into the eye of the stone, and is then reground, together with the gypsum, and is thoroughly mixed in the grinding. In this, as aforesaid, the mill acts as a mixer. The method of adding the size or other material which I do not wish to regrind in the mixing process illustrates the use of the invention with other forms of mixer. This size (or glue) cannot be ground with the gypsum in the millstones, but must be ground separately. I therefore add it (previously finely ground) to the mixed gypsum and coloring material, after these have been through the mill. This may be done in two ways. I may use a proportioning-conveyer similar to that used for the gypsum and coloring material to convey these from the mill, and convey the pulverized size by a similar conveyer from a separate receptacle and discharge it into the conveyer of the mixture made in the mill. In this case the conveyer, carrying all the ingredients, acts as a second mixer, thoroughly distributing the size with the other ingredients. This conveyer, which carries the size, is also geared to the driving mechanism of the mill, or to one of the other conveyers, so that it runs and varies with all, or, rather, so that all run and vary uniformly and equally; and if the mill be retarded or quickened, all the conveyers are in like degree retarded or quickened. Thus the proportions once established are accurately maintained.

Instead of using a conveyer from the stones, the mixture therefrom may be discharged, together with that of the size, into any other form of mixer, the proportions being accurately maintained and distributed by the conveyers described; but the ordinary screw-conveyer forms a mixer adapted to dry or wet material, and in the form described above, the proportioned mixture from the first two conveyers (united in the mill) is mixed in the conveyer, from the stones with the material delivered from the size-conveyer. It is the same in principle as if the stones were omitted, so far as the proportioning and mixing are concerned. The stones are interposed simply because some of the ingredients require grinding, and, as explained in my said patent, the stones require a regulated feed for the goods. The method, therefore, may be used without the grinding, by running two or more conveyers from their respective garners or hoppers to a common conveyer or other mixer, the conveyers from the garners being geared together, so as to run and vary equally and uniformly. In this way the proportions are automatically regulated and the materials thoroughly mixed.

In the drawing, the stones are represented at A. The conveyer for the gypsum is shown at B, and runs from a receptacle or garner, C, in which is a partly-covered and partly-uncovered conveyer, as shown in my said patent.

D represents a spout leading to the stones; and E e F are pulleys and belt connecting the gypsum-conveyer to the shaft K, which drives the stone, so that the conveyer runs with the stone.

G is the hopper.

A second conveyer, H, with like accessories, and geared to the shaft of conveyer B, supplies the coloring-matter, and runs with the conveyer B, so that the proportions of gypsum and coloring-matter, once exhibited, are always maintained, and the aggregate is always proportioned to the grinding capacity of the stones, however this may vary in speed.

The goods are discharged from the stones to the mixing-conveyer H, and there mixed with the proper proportion of size, which is brought by the conveyer M from a hopper, N. The conveyer M is connected to the shaft of the conveyer L, so that it runs and varies with that and the other conveyers, and maintains the proportion of the size with the other ingredients throughout all the variation in the speed of the stones or the speed of the conveyers. Manifestly the two conveyers may be omitted, and in this case the mixing-conveyer L would not be used, as the stones act as mixers for the ingredient, and are passed through them. It will be understood that the ingredients are moved by the conveyers in quantities or proportions, which, when once determined, are constantly maintained, so that the mixing commences when the united streams fall into the eye of the stones.

In regulating the proportions I may use conveyers of different size run at the same rate of speed, or of the same size run at different rates of speed.

It will be obvious that any other materials of granulated or pulverized form may be mixed in the same way by the same apparatus.

These conveyers are also capable of moving in regular determined quantities of plastic materials, paints, fertilizers, and the like, or they may be adapted to mix a proportion of baking-powder for self-raising flour, as the conveyer may be adapted to introduce the smallest proportion of one material with the largest of another.

It is obvious that, as the mechanisms are all connected, the stopping of one arrests all the others, and does not destroy the proportions.

I claim as my invention—

1. The hereinbefore-described mode of mixing granular or plastic materials in definite and uniform proportions, consisting in feeding by a positive conveyer the materials in regulated quantities to a grinding-mill or mixer, and in grinding or mixing the proportioned quantities as they unite, all substantially as described.

2. The described apparatus for mixing and proportioning granular or plastic materials in definite and uniform proportions, consisting of a grinding-mill or mixer, suitable garners and conveyers for positively feeding the materials, bands or gearing connecting the conveyers, and suitable spouts leading from the conveyers to the mill or mixer, substantially as described.

In testimony whereof I have signed my name to this specification in the presence of two subscribing witnesses.

MELVIN B. CHURCH.

Witnesses:
GEO. EASTMAN,
O. F. POWELL.